United States Patent
Hochet et al.

(10) Patent No.: US 6,537,413 B1
(45) Date of Patent: Mar. 25, 2003

(54) METHOD OF MAKING A REINFORCED COMPOSITE PANEL OF THE CELLULAR-CORE SANDWICH TYPE, AND A PANEL OBTAINED BY PERFORMING SUCH A METHOD

(75) Inventors: Nicolas Hochet, La Chapelle-sur-Oudon (FR); Francis Vendangeot, Chateaubriant (FR)

(73) Assignee: Peguform France, Saint-Marcel (FR)

( * ) Notice: Subject to any disclaimer, the term of this patent is extended or adjusted under 35 U.S.C. 154(b) by 0 days.

(21) Appl. No.: 09/485,142
(22) PCT Filed: Jun. 3, 1999
(86) PCT No.: PCT/FR99/01302
§ 371 (c)(1),
(2), (4) Date: Mar. 1, 2000
(87) PCT Pub. No.: WO99/64224
PCT Pub. Date: Dec. 16, 1999

(30) Foreign Application Priority Data

Jun. 5, 1998 (FR) .......................................... 98 07075

(51) Int. Cl.$^7$ .............................................. B32B 31/04
(52) U.S. Cl. ..................... 156/297; 156/285; 428/78; 428/116; 52/793.1
(58) Field of Search ............................... 156/285, 286, 156/287, 292, 297; 428/116, 117, 118, 78, 79, 47, 55; 52/782.11, 793.1; 296/188–189, 191; 244/119, 120, 123–126

(56) References Cited

U.S. PATENT DOCUMENTS 4,937,125 A * 6/1990 Sanmartin et al. .......... 428/116
5,709,925 A * 1/1998 Spengler et al. ............ 428/198
5,888,610 A * 3/1999 Fournier et al. ............ 428/116
6,187,411 B1 * 2/2001 Palmer ....................... 428/102

FOREIGN PATENT DOCUMENTS

| EP | 0 473 422 A1 | 3/1992 |
| EP | 0 551 776 A1 | 7/1993 |
| EP | 0 649 736 A1 | 4/1995 |
| EP | 0 783 959 A2 | 7/1997 |
| FR | S 436 675 | 4/1980 |
| WO | WO 88/03086 | 5/1988 |

* cited by examiner

*Primary Examiner*—Michael W. Ball
*Assistant Examiner*—Jessica Rossi
(74) *Attorney, Agent, or Firm*—Brooks & Kushman P.C.

(57) ABSTRACT

The invention relates to a method of making a reinforced composite panel of the sandwich type having a cellular core. In the method: a stack is formed that is made up of: at least one first skin (110) made of a reinforced thermoplastics material; a first reinforcing ply (120) made of a reinforced thermoplastics material; a cellular core (130) made of a thermoplastics material; a second reinforcing ply (140) made of a reinforced thermoplastics material; and a second skin (150) made of a reinforced thermoplastics material; each of the first and second reinforcing plies (120, 140) having a surface area that is smaller than the surface area of each of the first and second skins (110, 150), and said first and second reinforcing plies being positioned symmetrically about the plane formed by the cellular core at determined places against said skins; the stack is pre-assembled; the pre-assembled stack is heated in an oven; and said panel is formed by subjecting the heated stack to cold-pressing in a mold, under a pressure lying in the range $1 \times 10^6$ Pa to $3 \times 10^6$ Pa.

13 Claims, 1 Drawing Sheet

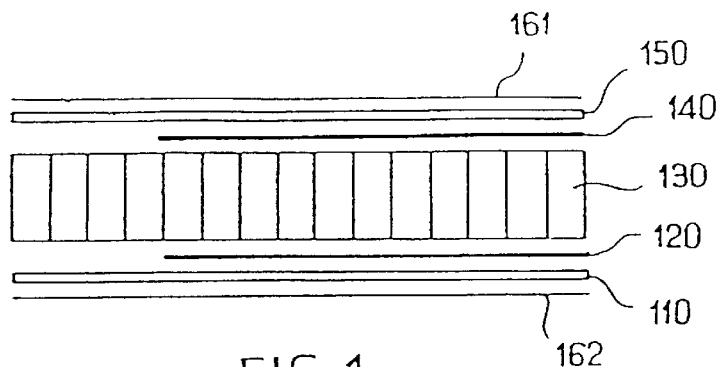
FIG_1
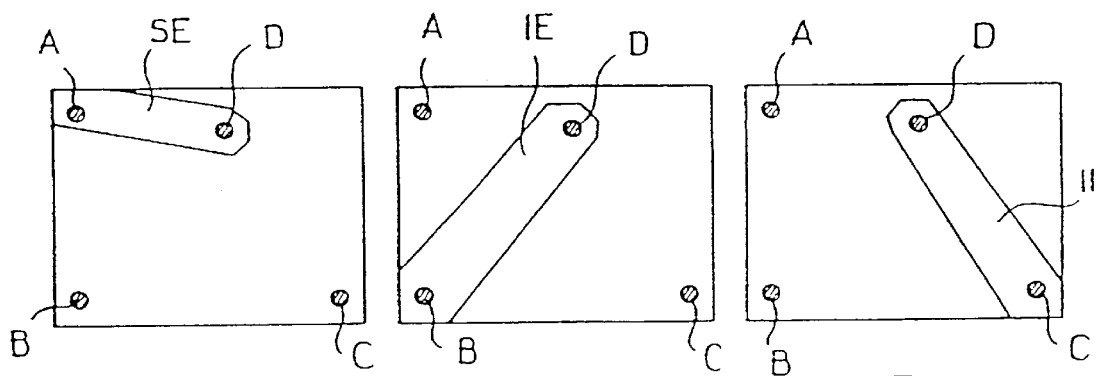
FIG_2a  FIG_2b  FIG_2c
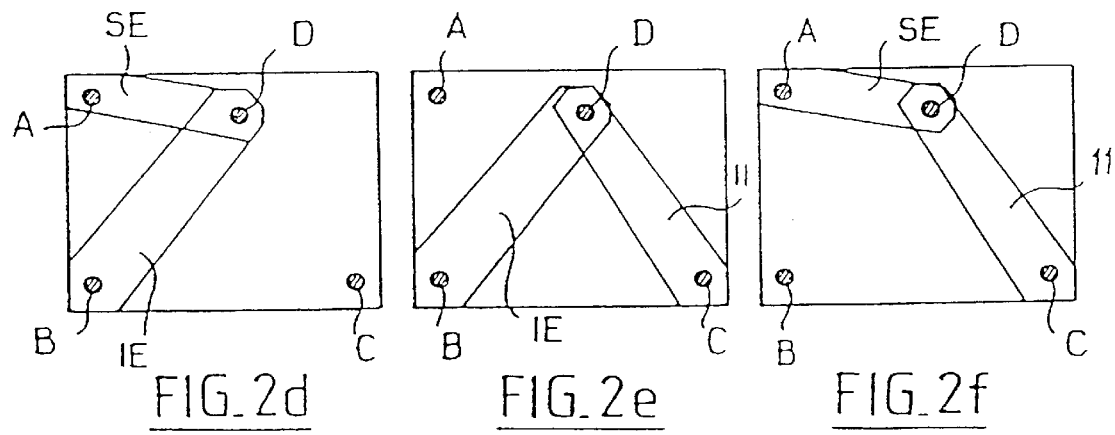
FIG_2d  FIG_2e  FIG_2f
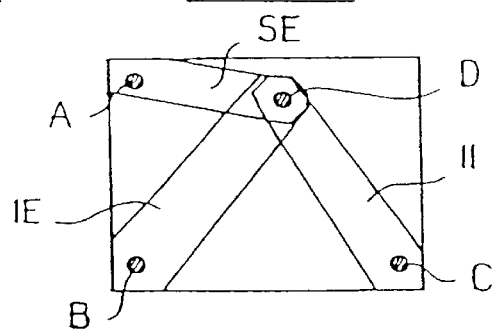
FIG_2g

METHOD OF MAKING A REINFORCED COMPOSITE PANEL OF THE CELLULAR-CORE SANDWICH TYPE, AND A PANEL OBTAINED BY PERFORMING SUCH A METHOD

CROSS-REFERENCE TO RELATED APPLICATIONS

This application claims the benefit of PCT application Serial No. PCT/FR99/01302, filed Jun. 3, 1999.

BACKGROUND OF THE INVENTION

1. Field of the Invention

The present invention relates generally to panels of sandwich-type composite structure having a cellular core, in particular for motor vehicles, and more particularly to a method of making such a panel whose structure is reinforced locally.

The present invention also relates to a reinforced composite panel of the cellular-core sandwich type obtained by performing such a method.

2. Background Art

Sandwich-type materials having cellular cores have very important characteristics resulting from their being light in weight.

Conventionally, such a panel is constructed by sandwiching a cellular core having low strength characteristics by gluing it or bonding it between two skins, each of which is much thinner than the cellular core but has excellent mechanical characteristics.

The Applicant's document FR 2 711 573 discloses a method of making a panel of sandwich-type composite structure having a cellular core. In that method, said panel is made in a single step by subjecting a stack to cold-pressing in a mold, which stack is made up of at least a first skin made of a stampable reinforced thermoplastics material, of a cellular core made of a thermoplastics material, of a second skin made of a stampable reinforced thermoplastics material, and of a first external covering layer made of a woven or non-woven material, said skins being pre-heated outside the mold to a softening temperature.

Such a method is particularly advantageous because of the fact that it makes it possible, in a single operation, both to generate cohesion between the various layers of the composite structure, and to shape said panel.

The resulting panel conserves all of the mechanical properties imparted by the cellular-core sandwich structure.

Panels of sandwich-type composite structure having a cellular core have strength characteristics sufficient to enable mechanical structures subjected to large stresses to be reinforced structurally without making them too heavy. Such panels are in common use in shipbuilding, aircraft construction, and rail vehicle construction.

However, the non-uniformness of the mechanical stresses to which they are subjected sometimes makes it necessary to form local reinforcing plies at those places in said panels where the mechanical stresses are greatest.

In the field of aircraft construction, sandwich-structure composite panels are made that are based on thermo-settable resins reinforced with glass fibers.

In order to impart the desired shapes to said panels, and to maintain said shapes, the glass fibers and the thermo-settable resin (in the form of pre-impregnates) are deposited layer-by-layer in a mold, and are then heated to high temperatures so as to cure (i.e. polymerize) the resin permanently.

The molds used may have a punch or a die, or else both a punch and a die.

Making such locally-reinforced panels consists firstly in defining zones where stresses are concentrated in the resulting panels, such zones being defined either by real testing or by computer simulation, and then in adding reinforcing plies at those places so as to make it possible to withstand such stresses.

The reinforcing plies are one-directional mats or woven fabrics of glass fibers, of carbon fibers, or of natural fibers embedded in a thermo-settable resin, with an orientation that is determined by the orientation of the stresses. They are cut out to a pattern using special machines, e.g. water-jet cutting machines.

The reinforcing plies are disposed layer-by-layer in a mold, either manually or by means of a robot, with each ply having its own orientation.

That operation may be referred to as the "laying up" operation.

Then comes the baking step which is the longest step of the method of making such pieces because the stack of layers must be heated sufficiently to cure the thermo-settable resin.

The various layers disposed in the mold are pressed in said mold by evacuating said mold. Such evacuation serves to press the materials against the die or the punch, and to remove surplus resin.

The desired shape is thus obtained with the fibers being impregnated with the resin as well as possible.

That "lamination" technique, and in particular the "laying up" operation, is characterized by a very low level of automation, and a large labor input.

Although, by means of the concept of localizing the strength, that technique makes it possible to achieve performance levels that are high for the pieces that are made in that way, it requires rigorous monitoring of quality.

As a result, that technique is very costly and cannot be used at the high production throughputs implemented in the field of the automobile industry.

The present invention therefore proposes a novel method of making reinforced composite panels of the cellular-core sandwich type, which method is simple and cheap, and can be implemented at high throughputs compatible with the production throughputs of the automobile industry, while also making it possible, without giving rise to any particular extra weight or extra cost, to make pieces that are suitable for structural applications which put their strength under stress.

SUMMARY OF THE INVENTION

More particularly, the invention provides a method of making a reinforced composite panel of the sandwich type having a cellular core, said method being characterized in that:

a stack is formed that is made up of: at least one first skin made of a reinforced thermoplastics material; a first reinforcing ply made of a reinforced thermoplastics material; a cellular core made of a thermoplastics material; a second reinforcing ply made of a reinforced thermoplastics material; and a second skin made of a reinforced thermoplastics material; each of the first and second reinforcing plies having a surface area that is smaller than the surface area of each of the first and second skins, and said first and second reinforcing plies being positioned symmetrically with respect to the plane formed by the cellular core at determined places against said skins;

the stack is pre-assembled;

the pre-assembled stack is heated in an oven; and said panel is formed by subjecting the heated stack to cold-pressing in a mold, under a pressure lying in the range $1 \times 10^6$ Pa to $3 \times 10^6$ Pa.

According to other advantageous and non-limiting characteristics of the method of the present invention:

said stack may include at least one other pair of third and fourth reinforcing plies, each of which has a surface area that is smaller than the surface area of each of the first and second skins, said third and fourth reinforcing plies being disposed symmetrically about the cellular core at determined places against said skins;

the stack may include three pairs of reinforcing plies organized in determined manner, symmetrically about the cellular core; and said stack may also include at least one outer covering layer made of a woven or a non-woven fabric disposed on the second skin, and optionally another outer covering layer made of a woven or a non-woven fabric placed under the first skin in the stacking order.

Advantageously, the forming pressure for forming the panel lies in the range $15 \times 10^5$ Pa to $20 \times 10^5$ Pa.

While said panel is being formed, the first and second skins have a forming temperature lying in the range approximately 160° C. to 200° C.

The first and second skins are constituted by a woven fabric or mat of glass fibers and of a thermoplastics material.

The reinforcing plies are also constituted by a woven fabric or mat of glass fibers and of a thermoplastics material.

The first and second skins have glass fiber weight per unit area that is different from that of the reinforcing plies.

The thermoplastics material used is a polyolefin and preferably polypropylene.

Preferably, the cellular core of the panel has an open-celled structure of the tubular or honeycomb cell type, constituted mainly by polyolefin and preferably polypropylene.

The invention also provides a reinforced composite panel of the sandwich type having a cellular core, made by performing the above-mentioned method.

The invention and how it may be implemented can be well understood from the following description given with reference to the accompanying drawing which is given by way of non-limiting example, and in which:

BRIEF DESCRIPTION OF THE DRAWINGS

FIG. 1 is a diagrammatic side view of a stack obtained by performing the method of the invention; and FIGS. 2a to 2g are diagrammatic plan views of testpieces obtained by performing the method of the invention.

DETAILED DESCRIPTION OF THE PREFERRED EMBODIMENTS

FIG. 1 shows a stack formed during a first step of a method of making a reinforced composite panel of the cellular-core sandwich type.

In this example, the stack is made up successively of: a first skin 110 made of a reinforced thermoplastics material; a first reinforcing ply 120 made of a reinforced thermoplastics material; a cellular core 130 made of thermoplastics material; a second reinforcing ply 140 made of a reinforced thermoplastics material; and a second skin 150 made of a reinforced thermoplastics material.

In addition, the stack includes an outer covering layer 161 made of a woven or non-woven material disposed on the second skin 150, and another outer covering layer 162 made of a woven or non-woven material placed under the first skin 110 in the stacking order.

The outer covering layers 161, 162 may be made of felt or of carpeting.

Each of the first and second reinforcing plies 120, 140 has a surface area smaller than the surface area of each of the first and second skins 110, 150, and said first and second reinforcing plies are positioned symmetrically about the plane formed by the cellular core at determined places against said skins.

More particularly, they are positioned at those predetermined places of the panel which are to be subjected to the greatest mechanical stresses.

In variant embodiments, provision may be made for the stack to include another pair of third and fourth reinforcing plies, each of which has a surface area smaller than the surface area of each of the first and second skins, the third and fourth reinforcing plies being disposed symmetrically about the cellular core at other determined places against said skins.

Similarly, the stack may include three pairs of reinforcing plies organized in determined manner, symmetrically about the cellular core. In other variants, the stack may include an even larger number of reinforcing plies.

Each of the first and second skins 110, 150 is advantageously constituted by a woven fabric or mat of glass fibers and of a thermoplastics material.

Each of the reinforcing plies 120, 140 is advantageously constituted by a woven fabric or mat of glass fibers and of a thermoplastics material.

The thermoplastics material used is a polyolefin and preferably polypropylene.

Adding reinforcing plies to the stack automatically leads the weight of the resulting structural panel being increased.

In order to limit this increase in weight, it is essential that the adding of the reinforcing plies is well controlled, and that only the bare minimum is added.

Simultaneously, the additional weight constituted by the reinforcing plies must be compensated by reducing the weight per unit area of glass fibers in the first and second skins used: by astutely combining the weight per unit area of glass fibers in the skins with the characteristics of the reinforcing plies, it is possible to obtain a panel of weight equivalent to the weight of a panel that does not use reinforcing plies, while offering strength that is more suited to its structural application.

Thus, the first and second skins 110, 150 are of glass fiber weight per unit area that is different from that of the reinforcing plies 120, 140.

For example, the materials used for the first and second skins, as well as for the reinforcing plies of the stack may be: a 4×1 textile having 4 warp threads for one weft thread with 800 filaments per thread, an 8×2 textile that also has four warp threads for one weft thread, each thread being composed of 1600 filaments, a balanced textile that has as many weft threads as it does warp threads, a mat of long fibers whose directions are balanced, a mat of long fibers having a preferred orientation for 80% of the long fibers (directional mat), or else a one-directional mat. The available weights per unit area are, for example, for a 4×1 textile: 400 g/m$^2$; for an 8×2 textile: 900 g/m$^2$, or 1,350 g/m$^2$; for a balanced fabric: 710 g/m$^2$ $^{or}$ 1,420 g/m$^2$; for a balanced mat: 1,500 g/m²; for a directional mat: 500 g/m²; and for a one-directional mat: 800 g/m².

Advantageously in this example, the cellular core 130 is an open-celled structure of the type made up of tubes or of a honeycomb, and it is made mainly of polyolefin and preferably of polypropylene.

In a second step of the method of the invention, the stack is pre-assembled. Then the pre-assembled stack is heated in an oven.

The pre-assembled stack is heated such that the first and second skins 110, 150 of the stack have a forming temperature approximately in the range 160° C. to 200° C.

It should be noted that the temperatures to which the pre-assembled stack is heated are higher than the degradation temperature of the polypropylene constituting the matrices of the first and second skins, as well as the matrices of the reinforcing plies and of the cellular core, but surprisingly that does not degrade the mechanical characteristics of the resulting panel.

The temperature to which the pre-assembled stack is heated in the method of the invention lies in a range extending from a low temperature enabling the first and second skins to be bonded to the cellular core, in a time compatible with mass production constraints, without the cellular core of said stack being weakened accordingly, to a maximum temperature while avoiding degrading the polypropylene too rapidly.

In the method of the invention, it is possible to add the reinforcing plies to the stack that is to be thermoformed to make the panel because said method offers a heating capability that is sufficient to bond the first and second skins which are of different thicknesses (due to the added reinforcements).

The quantity of heat transmitted through the skins and the cellular core is inversely proportional to the thickness of the skin, for identical colors and types of reinforcement.

For a given pre-assembled stack temperature and a given pre-assembled stack heating time, it is possible to bond a skin of given thickness. If the skin is too thin, it reaches a temperature such that it is degraded.

If the skin is too thick, the heat does not arrive in sufficient quantity to enable the skin and the core to be bonded together.

For example, in order to bond a skin made of a 4×1 woven fabric of weight per unit area of 915 g/m² to a cellular core, provision is made for the heating time to lie in the range 55 seconds to 75 seconds. By using an identical skin of weight per unit area of 1,420 g/m², a heating time lying in the range 70 seconds to 85 seconds is necessary to bond the skin to the cellular core without degrading it. Similarly, it has been determined that, for an identical skin having a weight per unit area of 710 g/m², a heating time lying in the range 55 seconds to 65 seconds is necessary to bond it to the cellular core without degrading it.

Thus, in the method of the invention, for a stack including skins of a weight per unit area of about 915 g/m², with reinforcing plies of weight per unit area lying in the range 0 to 500 g/m² (thus for a weight per unit area range extending from 915 g/m² to 1,400 g/m²), the heating time for which the pre-assembled stack is heated lies in the range 70 seconds to 75 seconds.

In a last step of the method of the invention, after the pre-assembled stack has been heated in an oven, said panel is formed by subjecting the heated stack to cold-pressing in a mold under a pressure lying in the range $1 \times 10^6$ Pa to $3 \times 10^6$ Pa.

Preferably the panel-forming pressure lies in the range $15 \times 10^5$ Pa to $20 \times 10^5$ Pa.

The method of the invention comprises a small number of operations that are simple and quick to perform.

It uses standard equipment (oven, press) for performing the above-mentioned operations which are controlled very well, and therefore entirely suitable for being implemented in the field of the automobile industry, in which the parts are formed at high production throughputs, while also guaranteeing constant quality and economic competitiveness.

The panels made by performing the method of the invention offer strength that is optimized locally, without suffering from any extra weight compared with panels not including any reinforcing plies, or from any extra manufacturing cost.

One of the advantageous applications of such panels whose structure is reinforced by reinforcing plies is to making seatbacks for rear seats in motor vehicles, and in particular the seatbacks of rear seats having seatbelts fitted to their seatbacks.

In its bottom portion, such a rear seatback is provided with two hinges for hinging to the bodywork of the vehicle, the two hinges being positioned on the outer side and on the inner side of the seatback, and enabling it to be folded down forwards, and, in a region situated at the top on the outer side of said seatback, the seatback is provided with an anchor point at which it is anchored to the bodywork of the vehicle so as to hold it in the upright position.

In addition, when the seatbelt is fitted to the seatback, a seatbelt anchor point is provided in the structure of the rear seatback on inner side thereof, opposite from the fastening point at which the seatback is fastened to the bodywork of the vehicle, so as to enable the middle "seat" of the rear seat to be fitted with a seatbelt that has three anchor points like the seatbelts fitted to the right and left "seats" of the rear seat.

The force applied to each fixing point is very large.

In order to withstand such forces without increasing the weight of the seatback too much and while limiting its manufacturing cost, it is particularly advantages to use a panel of reinforced structure made using the method of the present invention.

FIGS. 2a to 2g shows various testpieces corresponding to ⅔ rear seatbacks (i.e. the two-thirds portion of the back of a seat split two-thirds/one-third) with seatbelts fitted to them, which seatbacks are provided with the above-mentioned hinge, fastening, and anchor points, respectively referenced A to D.

The various testpieces shown in FIGS. 2a to 2g were made by performing the method of the invention, and they included different numbers of pairs of reinforcing plies.

The testpiece shown in FIG. 2a includes a single pair of reinforcing plies SE extending between the top outer fastening point A for fastening to the bodywork and the seatbelt traction point D.

The testpiece shown in FIG. 2b includes a single pair of reinforcing plies IE extending between the outer hinge B and the seatbelt traction point D.

The testpiece shown in FIG. 2c includes a single pair of reinforcing plies II extending between the inner hinge C and the seatbelt traction point D.

The testpiece shown in FIG. 2d includes two pairs of reinforcing plies, namely a first pair of reinforcing plies SE extending between the top outer fastening point A for fastening to the bodywork and the seatbelt traction point D, and a second pair of reinforcing plies IE extending between the outer hinge B and the seatbelt traction point D.

The testpiece shown in FIG. 2e includes two pairs of reinforcing plies, namely a first pair of reinforcing plies IE extending between the outer hinge B and the seatbelt traction point D, and a second pair of reinforcing plies II between the inner hinge C and the seatbelt traction point D.

The testpiece shown in FIG. 2f includes two pairs of reinforcing plies, namely a first pair of reinforcing plies SE extending between the top outer fastening point A and the seatbelt traction point D, and a second pair of reinforcing plies II extending between the inner hinge C and the seatbelt traction point D.

Finally, the testpiece shown in FIG. 2g includes three pairs of reinforcing plies, namely a first pair of reinforcing plies SE extending between the outer fastening point A and the seatbelt traction point D, a second pair of reinforcing plies IE extending between the outer hinge B and the seatbelt traction point D, and a third pair of reinforcing plies II extending between the inner hinge C and the seatbelt traction point D.

The characteristics of the skins and of the reinforcing plies for the various above-mentioned testpieces are explained for three different series in the following table.

| SERIES | 970616/S5 | 9706016/S6 | 970616/S7 |
|---|---|---|---|
| Testpieces | FIGS. 2a to 2g | FIGS. 2a to 2c | FIGS. 2a to 2g |
| Skins | Balanced woven fabric 1420 g/m² | Balanced woven fabric 1420 g/m² | Balanced woven fabric 1420 g/m² |
| Reinforcements | 4 × 1 woven fabric 400 g/m² | 4 × 1 oriented mat 500 g/m² | 1-directional mat 800 g/m² |

The tests on the various series of testpieces consisted in exerting a vertical traction force by means of an electric hoist on each of said testpieces, at the position of the top seatbelt-anchor point D. A first sensor was fixed both to the support frame of the hoist and to the traction point on the back of the testpiece under test. The purpose of this sensor was to measure the displacement of the traction point. A second sensor was fixed both to the support frame of the hoist and to the free corner on the back of the testpiece under test. The purpose of this sensor was to measure the displacement of the free corner not fixed to the structure. In addition, a force sensor was interposed between the hook of the hoist and the testpiece under test so as to measure the traction force.

The results of tests on the various above-mentioned testpieces showed that the use of a single pair of reinforcing plies did not make it possible to improve significantly the results of the tests on testpieces constituted by stacks not including any reinforcing plies.

In contrast, the testpieces including two pairs of reinforcing plies seemed to improve the test results significantly. The most marked improvement was obtained with the testpieces including three pairs of reinforcing plies (see testpiece in FIG. 2g).

With three pairs of reinforcing plies, it was possible to reach and even to exceed (see series 970616/S7) the values obtained with skins of weight per unit area of 2,130 g/m² provided in a stack with no reinforcement, i.e. resistance to a mean traction force of greater than 10,000 Newtons for a mean displacement of the free corner of about 300 millimeters.

The surface area of each of the reinforcing plies used for making these testpieces was about 0.04 m² as compared with the surface area of the skin which was about 0.44 m².

It is interesting to note that a rear seatback made with skins of glass fiber weight per unit area of 1,420 g/m², and with reinforcing plies made of one-directional mats with a glass fiber weight per unit area of 800 g/m², has a weight of 1.31 kg and a cost of 33.32 French francs.

The same seatback made by means of a stack not using reinforcements but with skins of glass fiber weight per unit area of 2,130 g/m² offers equivalent strength and has a weight of 1.87 kg for a cost of 46.86 French francs.

Thus, the use of reinforcements in accordance with the present invention makes it possible to reduce both the cost and the weight of the part for equivalent mechanical characteristics.

The present invention is in no way limited to the implementations described and shown, but rather the person skilled in the art can make any variants thereto that lie within the spirit of the invention.

What is claimed is:

1. A method of making a locally reinforced composite panel of the sandwich type having a cellular core, said method being characterized in that:

a stack is formed that is made up of: at least one first skin (110) made of a reinforced thermoplastics material; a first reinforcing ply (120) made of a reinforced thermoplastics material; a cellular core (130) made of a thermoplastics material; a second reinforcing ply (140) made of a reinforced thermoplastics material; and a second skin (150) made of a reinforced thermoplastics material; each of the first and second reinforcing plies (120, 140) having a surface area that is smaller than a surface area of each of the first and second skins (110, 150), and said first and second reinforcing plies being positioned symmetrical with respect to a plane formed by the cellular core at places against said skins which are predetermined to be subjected to greatest mechanical stresses;

the stack is pre-assembled;

the pre-assembled stack is heated in an oven; and said panel is formed by subjecting the heated stack to cold-pressing in a mold, under a pressure lying in the range $1 \times 10^6$ Pa to $3 \times 10^6$ Pa in a single step of molding so that high production throughput is provided and the panel is optimally strengthened locally without suffering from any extra weight.

2. A method according to claim 1, characterized in that said stack includes at least one other pair of third and fourth reinforcing plies, each of which has a surface area that is smaller than the surface area of each of the first and second skins, said third and fourth reinforcing plies being disposed symmetrically about the cellular core at determined places against said skins.

3. A method according to claim 1, characterized in that the stack includes three pairs of reinforcing plies organized in a determined manner, symmetrically about the cellular core.

4. A method according to claim 1, characterized in that the forming pressure for forming the panel lies in the range $15 \times 10^5$ Pa to $20 \times 10^5$ Pa.

5. A method according to claim 1, characterized in that, while said panel is being formed, the first and second skins (110, 150) have a forming temperature lying in the range from approximately 160° C. to 200° C.

6. A method according to claim 1, characterized in that the reinforcing plies (120, 140) are constituted by a woven fabric or mat of glass fibers and of a thermoplastics material.

7. A method according to claim 1 characterized in that the cellular core (130) of the panel has an open-celled structure of the tubular or honeycomb cell type, constituted mainly by polyolefin.

8. A method according to claim 1, characterized in that said stack includes at least one outer covering layer (161) made of a woven or a non-woven fabric disposed on the second skin (150).

9. A method according to claim 8, characterized in that said stack includes another outer covering layer (162) made of a woven or a non-woven fabric placed under the first skin (110) in the stacking order.

10. A method according to claim 1, characterized in that the first and second skins (110, 150) are constituted by a woven fabric or mat of glass fibers and of a thermoplastics material.

11. A method according to claim 10, characterized in that the first and second skins (110, 150) have glass fiber weight per unit area that is different from that of the reinforcing plies (120, 140).

12. A method according to claim 10, characterized in that the thermoplastics material is a polyolefin.

13. A reinforced composite panel of the sandwich type having a cellular core, made by performing the method according to claim 1.

* * * * *